(12) United States Patent
Chiku et al.

(10) Patent No.: US 7,175,058 B2
(45) Date of Patent: Feb. 13, 2007

(54) SPARE TIRE COVER

(75) Inventors: Shigenobu Chiku, Tochigi (JP);
Tsuyoshi Watanabe, Tochigi (JP);
Matsuo Iwama, Saitama (JP)

(73) Assignees: TS Tech Co., Ltd., Saitama (JP);
Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/487,854

(22) PCT Filed: Jun. 3, 2002

(86) PCT No.: PCT/JP02/05456

§ 371 (c)(1),
(2), (4) Date: Sep. 20, 2004

(87) PCT Pub. No.: WO03/020576

PCT Pub. Date: Mar. 13, 2003

(65) Prior Publication Data

US 2005/0016877 A1    Jan. 27, 2005

(30) Foreign Application Priority Data

Aug. 30, 2001    (JP) .............................. 2001-261830

(51) Int. Cl.
*B62D 43/00* (2006.01)

(52) U.S. Cl. .................. 224/42.2; 206/304.1; 296/37.3

(58) Field of Classification Search .................. 40/209, 40/587; 224/42.2; 296/37.3; 206/304.1; 293/117
See application file for complete search history.

(56) References Cited

U.S. PATENT DOCUMENTS

| RE20,220 | E | * | 12/1936 | Lyon ........................ 206/304.2 |
| 3,326,259 | A | * | 6/1967 | McCollegan ............. 206/304.1 |
| 4,932,573 | A | * | 6/1990 | Flint ........................ 224/42.12 |
| 5,996,863 | A | * | 12/1999 | Burke ........................ 224/42.2 |

FOREIGN PATENT DOCUMENTS

| JP |   460785 |   | 5/1992 |
| JP | 7-323869 | * | 12/1995 |
| JP |   971270 |   | 3/1997 |
| JP | 9-315351 | * | 12/1997 |
| JP | 10-244974 | * | 8/1998 |
| JP | 11147487 |   | 6/1999 |
| JP | 2000-43765 | * | 2/2000 |

* cited by examiner

*Primary Examiner*—Tri M. Mai
(74) *Attorney, Agent, or Firm*—Dann, Dorfman, Herrell and Skillman, P.C.

(57) ABSTRACT

A spare tire cover includes a cup-shaped hard top cover having a substantially cylindrical portion, an inner surface of which is provided with a plurality of inwardly directed projections arranged at predetermined circumferential intervals, a substantially cylindrical fixing plate having a plurality of holes for receiving the plurality of inwardly directed projections to secure the fixing plate to the top cover, and a flexible rear cover having a peripheral edge that is attached to the fixing plate.

10 Claims, 14 Drawing Sheets

SPARE TIRE COVER

TECHNICAL FIELD

The present invention relates to an improvement of a spare tire cover which covers a spare tire mounted to a rear portion or the like of a vehicle body.

BACKGROUND ART

Figure 13:
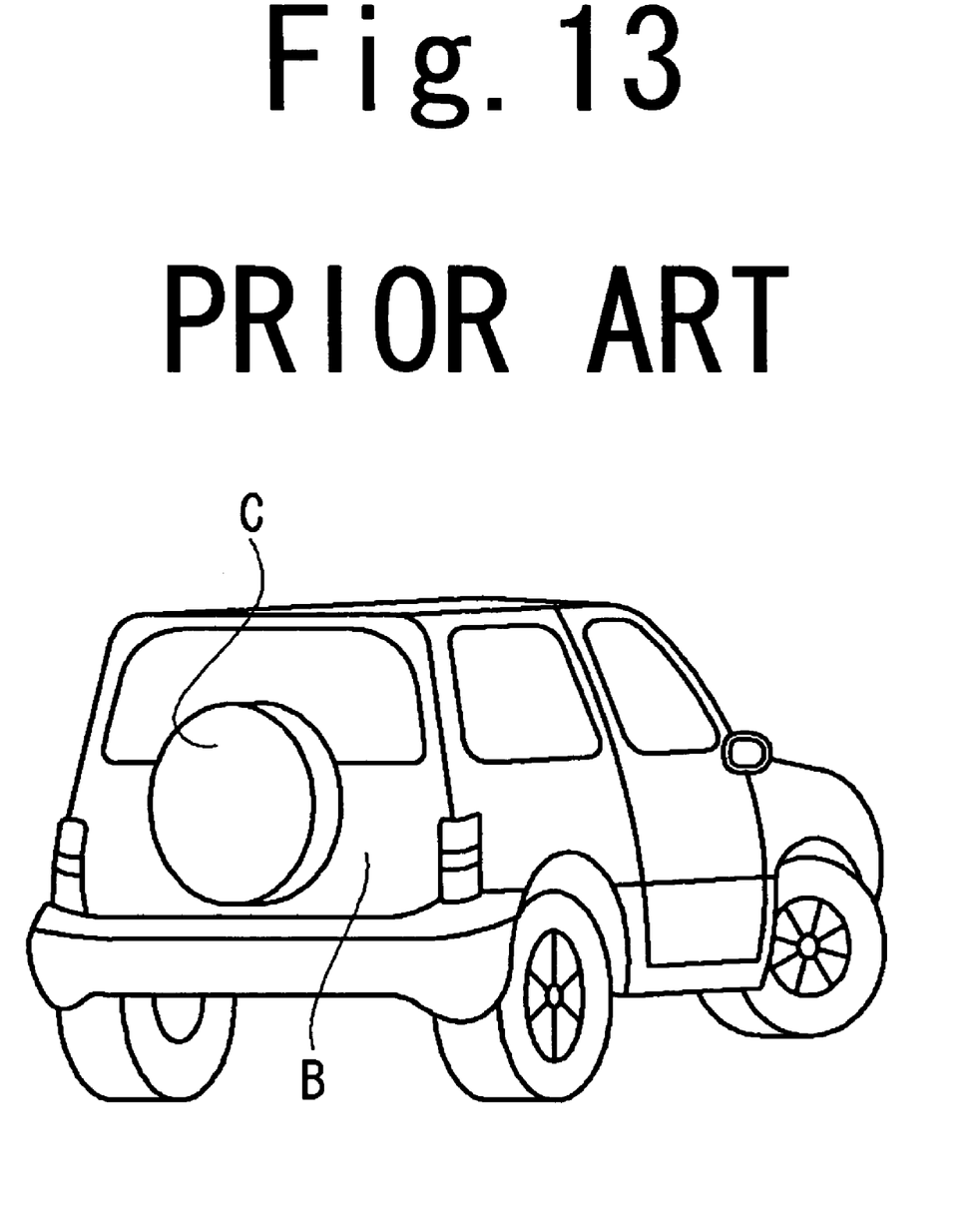
FIG. 13 is a schematic view showing a type of motor vehicle in which the spare tire is mounted in accordance with a prior art embodiment.

In general, in a type of motor vehicle such as an off-road car or the like shown in FIG. 13, a base table having a plurality of stud bolts protruding therefrom is provided in a rear portion of a vehicle body B. A spare tire is mounted to the rear portion of the vehicle body B by inserting the stud bolts through bolt holes in a tire wheel and secured using nuts. The spare tire is then covered by a tire cover C.

A conventional spare tire cover typically includes a cup-shaped hard top cover that extends across the rear face of the spare tire and part of the way along the edge of the spare tire up to a tread portion. A flexible rear cover is integrally attached to the peripheral edge of the hard cover adjacent the tread portion of the spare tire and is formed in a doughnut shape with a rubber band for elastically drawing together a center opening. In this way, the flexible cover extends from the peripheral edge of the hard cover along the edge of the spare tire and across part of the face of the spare tire facing towards the rear portion of the vehicle body. (Japanese Utility Model Application Laid-Open No. 4-60785).

Because the top cover is hard and bulky, it is difficult and time consuming to integrally attach the top cover and the flexible rear cover together. The seam between the top cover and the rear cover is also exposed on an exterior portion of the spare tire cover. Further, it is necessary to use the rubber band to draw together and expand the center opening of the rear cover every time the spare tire cover is to be attached and detached. This is also quite time consuming.

In order to make it easy to attach and detach the spare tire cover, the spare tire cover can be modified so that zipper teeth tapes are respectively attached to the outer peripheral edges of the hard top cover and the flexible rear cover. A slide fastener is provided, and a rubber molding can be used to cover the seam between the two parts of the spare tire cover by overlapping with a side of the flexible rear cover (Japanese Patent Application Laid-Open No. 9-71270).

Even this is not acceptable because the zipper teeth tape still has to be sewn into the hard and bulky top cover.

A main object of the present invention is to provide a spare tire cover which can be constructed on the basis of a simple operation without the need to sew the flexible rear cover or a zipper teeth tape to the large and bulky hard top cover. The rear cover is integrally attached to the top cover on the basis of a strong structure and the spare tire cover has a good appearance.

In addition, another object of the present invention is to provide a spare tire cover which can prevent noise or the like from being generated due to a friction between the top cover and the tire, and can be further easily attached and detached.

DISCLOSURE OF THE INVENTION

In accordance with the present invention, there is provided a spare tire cover comprising:

a cup-shaped hard top cover having a substantially cylindrical portion, the inner surface of which is provided with a plurality of inwardly directed projections arranged at predetermined circumferential intervals;

a substantially cylindrical fixing plate having a plurality of holes for receiving the plurality of inwardly directed projections to secure the fixing plate to the top cover; and a flexible rear cover having a peripheral edge that is attached to the fixing plate.

In this spare tire cover, since a seamed portion of the flexible rear cover is bonded and fixed to the inner surface of the hard top cover using the fixing plate, there is no need to sew the rear cover or the zipper teeth to the large and bulky top cover. The seamed portion of the rear cover is wound up and held to the inner side from the outer peripheral edge of the top cover by the fixing plate, so that the seam is not exposed to an outer surface of the top cover. It is therefore possible to construct a spare tire cover having a good appearance.

The flexible rear cover can be integrally attached to the fixing plate around all of its peripheral edge. On the other hand, the flexible rear cover can be integrally attached to the fixing plate around just part of its peripheral edge, the remaining part of the peripheral edge being attached to zipper teeth tape and wherein a zipper teeth tape is integrally attached to the fixing plate.

In a different embodiment, the flexible rear cover can be attached to a zipper teeth tape around all of its peripheral edge and wherein a zipper teeth tape is integrally attached to the fixing plate.

Where a zipper teeth tape is provided, the spare tire cover preferably includes a slide fastener which runs along the zipper teeth of the first and second zipper teeth tapes.

The fixing plate may be provided with a rib on each side of the plurality of holes. The top cover preferably has a corner portion and a face portion. The inner surface of the face portion adjacent the corner portion can be provided with at least one elastic pad for contacting an outer surface of a spare tire in use. The spare tire cover can therefore prevent an abnormal noise from being generated due to friction between the spare tire and the top cover.

The inner surface of the corner portion is preferably provided with a plurality of reinforcing ribs.

The fixing plate can be formed in a plurality of separate sections. The fixing plate can also be made of the same material as the top cover and can be welded thereto.

The fixing plate and the cover part are formed from a resin material.

The features other than the features mentioned above will be apparent in an embodiment of the present invention described below.

MODE FOR CARRYING OUT THE INVENTION

Figure 1:
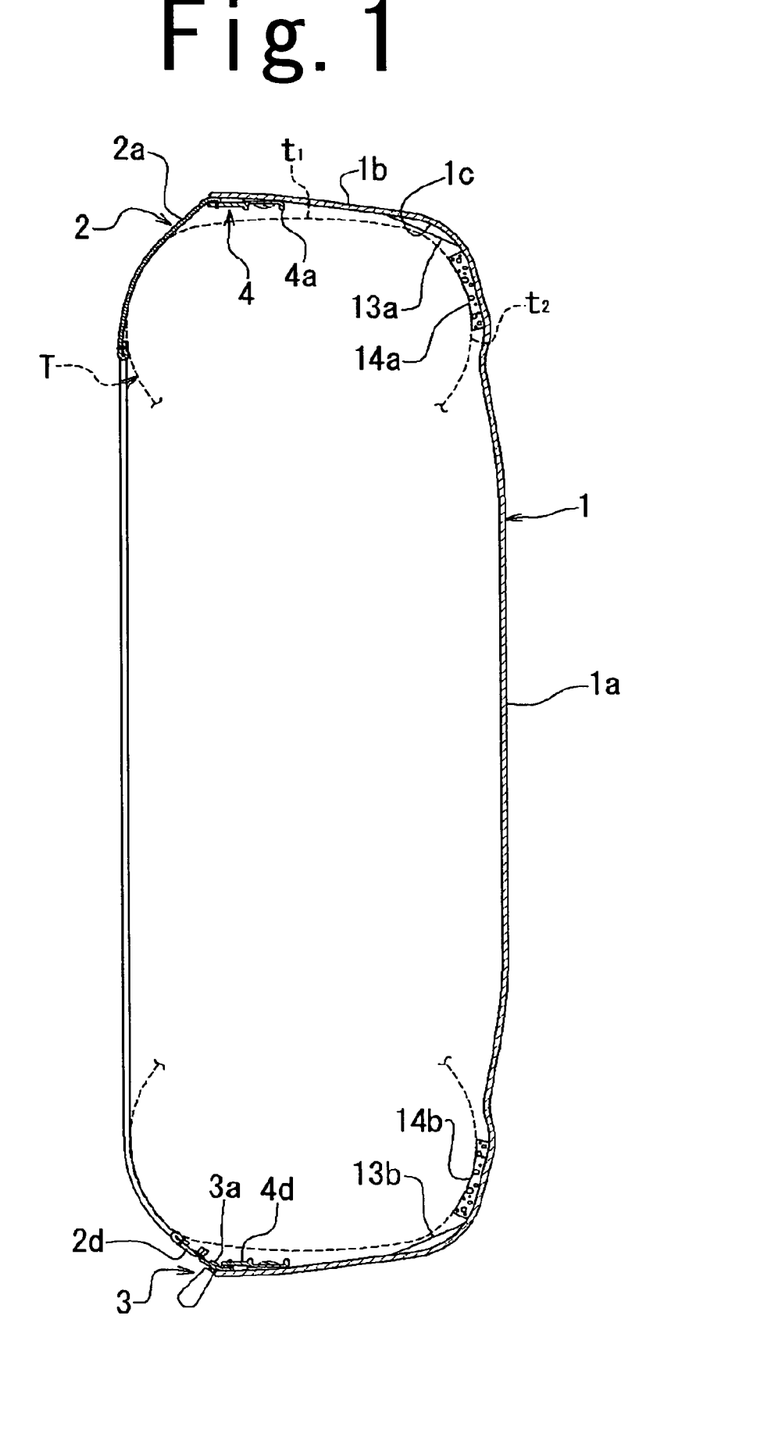
FIG. 1 is a side cross-sectional view showing a spare tire cover in accordance with the present invention.

A description will be given of an embodiment with reference to FIGS. 1 to 12. An illustrated embodiment of the spare tire cover includes a cup-shaped hard top cover 1 receiving a spare tire T from one side surface thereof to a tread portion $t_1$, and a flexible rear cover 2 covering another side surface of the spare tire T by a defined width surface from an outer peripheral edge of the top cover 1 to a center opening. A slide fastener 3 is provided in a main portion between the top cover 1 and the rear cover 2, as shown in FIG. 1. In this case, "upper and lower" and "right and left" in the description are given on the basis of a mounting attitude of the spare tire T.

Figure 2:
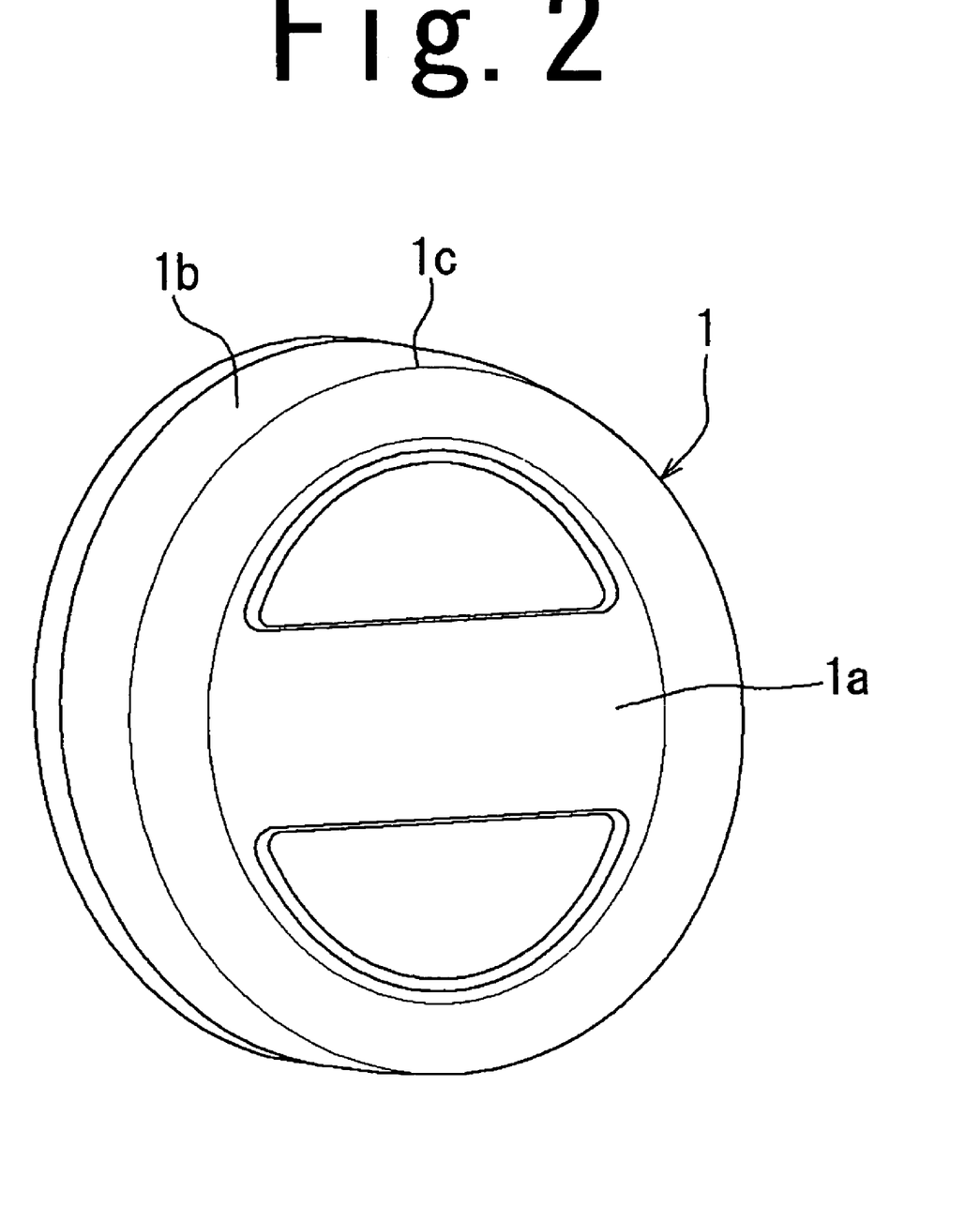
FIG. 2 is a perspective view showing the spare tire cover of FIG. 1 from a side of a top cover.

The top cover 1 is formed by a disc-like face portion 1a, a substantially cylindrical portion 1b and a rounded corner portion 1c continuously connected to the cylindrical portion 1b and the face portion 1a so that the whole of the top cover 1 forms a cup shape, as shown in FIG. 2. The whole of the top cover 1 is formed from a resin material such as a hard polypropylene or the like which can be welded by an ultrasonic wave by welding and bonding projections mentioned below.

Figure 3:
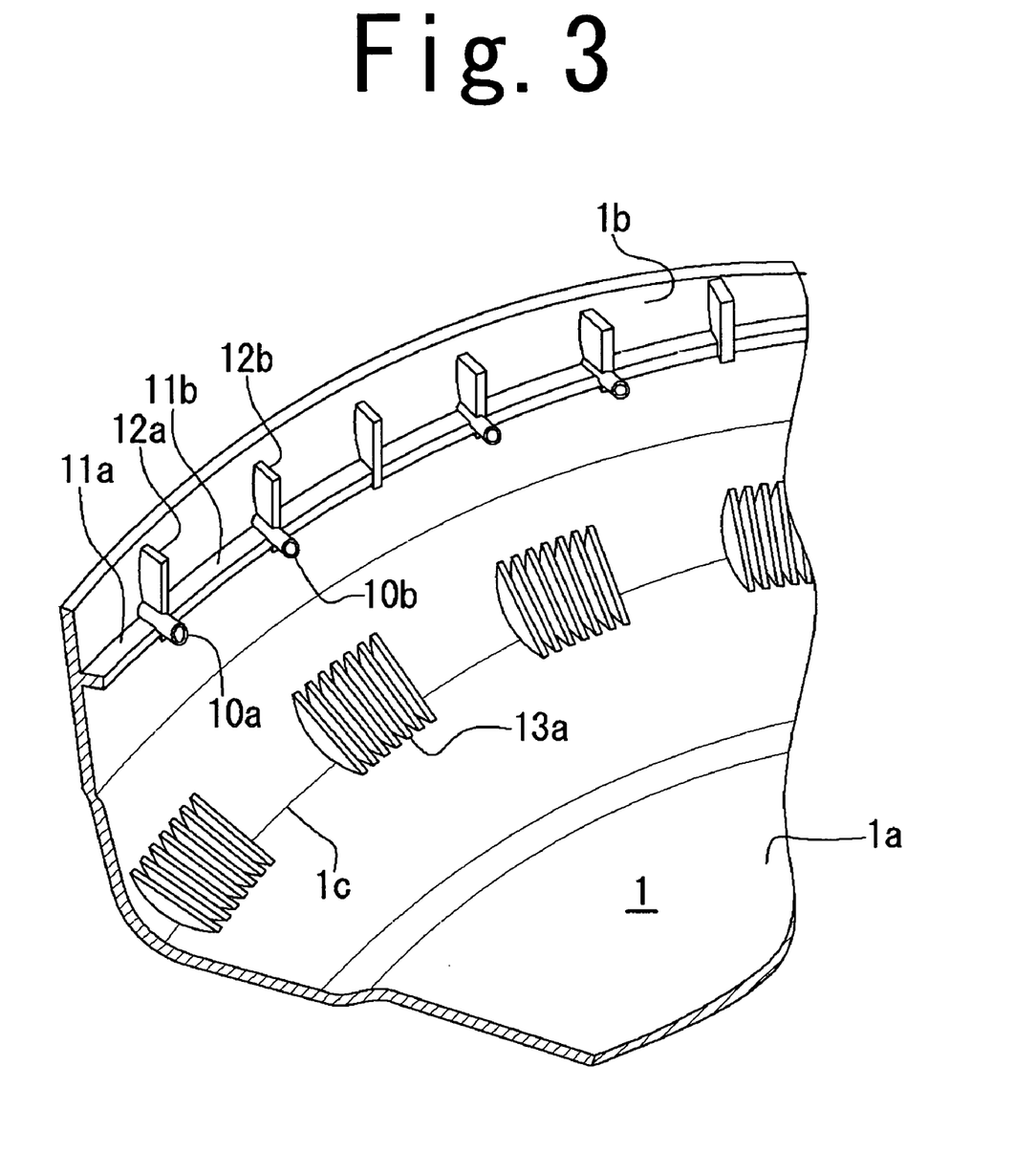
FIG. 3 is a partial perspective view showing the top cover forming part of the spare tire cover of FIG. 1 from an inner side.

A plurality of cylindrical projections 10a and 10b protrude radially at predetermined circumferential intervals of the outer peripheral edge of the cylindrical portion 1b, as shown in FIG. 3. The projections 10a and 10b are supported by ribs 11a and 11b continuously connecting the adjacent projections to each other so as to position a reinforcing and fixing plate, as described below. The projections 10a and 10b are also supported by ribs 12a and 12b extending in an orthogonal direction. Further, a plurality of ribs 13a and 13b which reinforce the corner portion 1c from an inner surface side and fill up a gap with respect to a shoulder portion of the spare tire T are provided at predetermined circumferential intervals.

Figure 4:
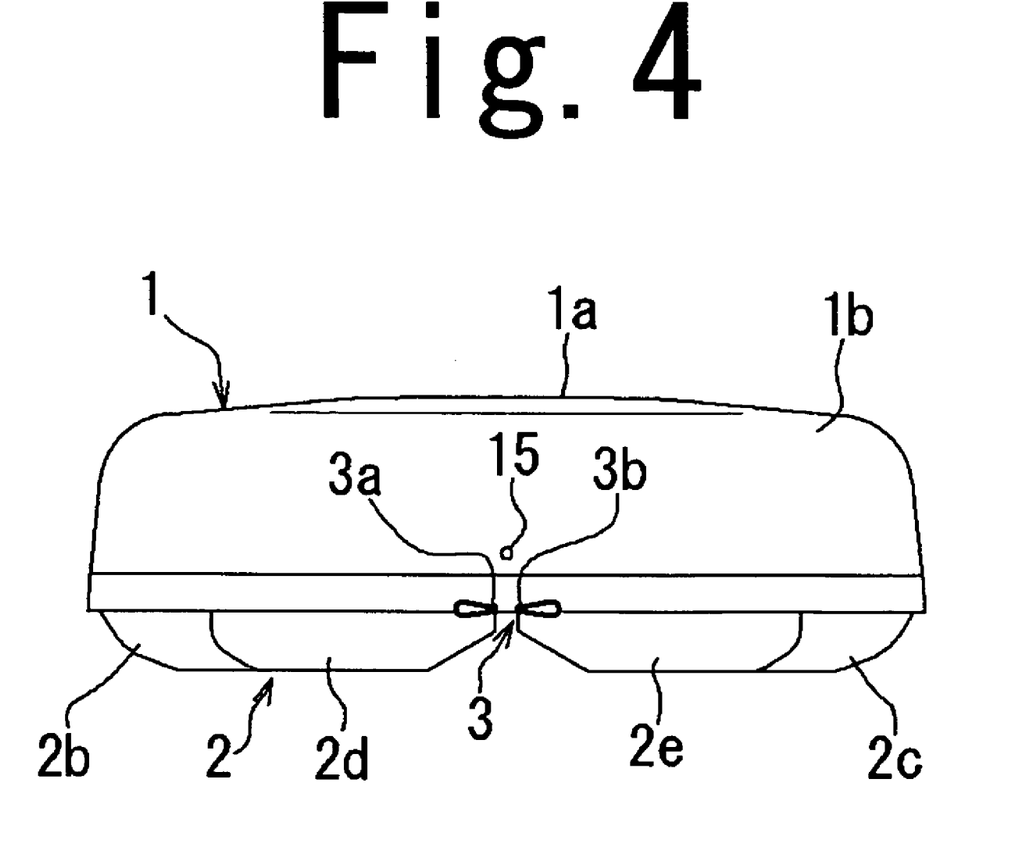
FIG. 4 is a bottom elevational view showing the spare tire cover of FIG. 1.

Elastic pads 14a and 14b (refer to FIG. 1) made of a urethane foam or the like which receive a side wall portion $t_2$ of the spare tire T are respectively attached to an inner surface of the face portion 1a near the upper, lower, left and right-hand corner portions 1c. Further, as shown in FIG. 4, one drain hole 15 is provided in the center of a lower part of the cylindrical portion 1b.

Figure 5:
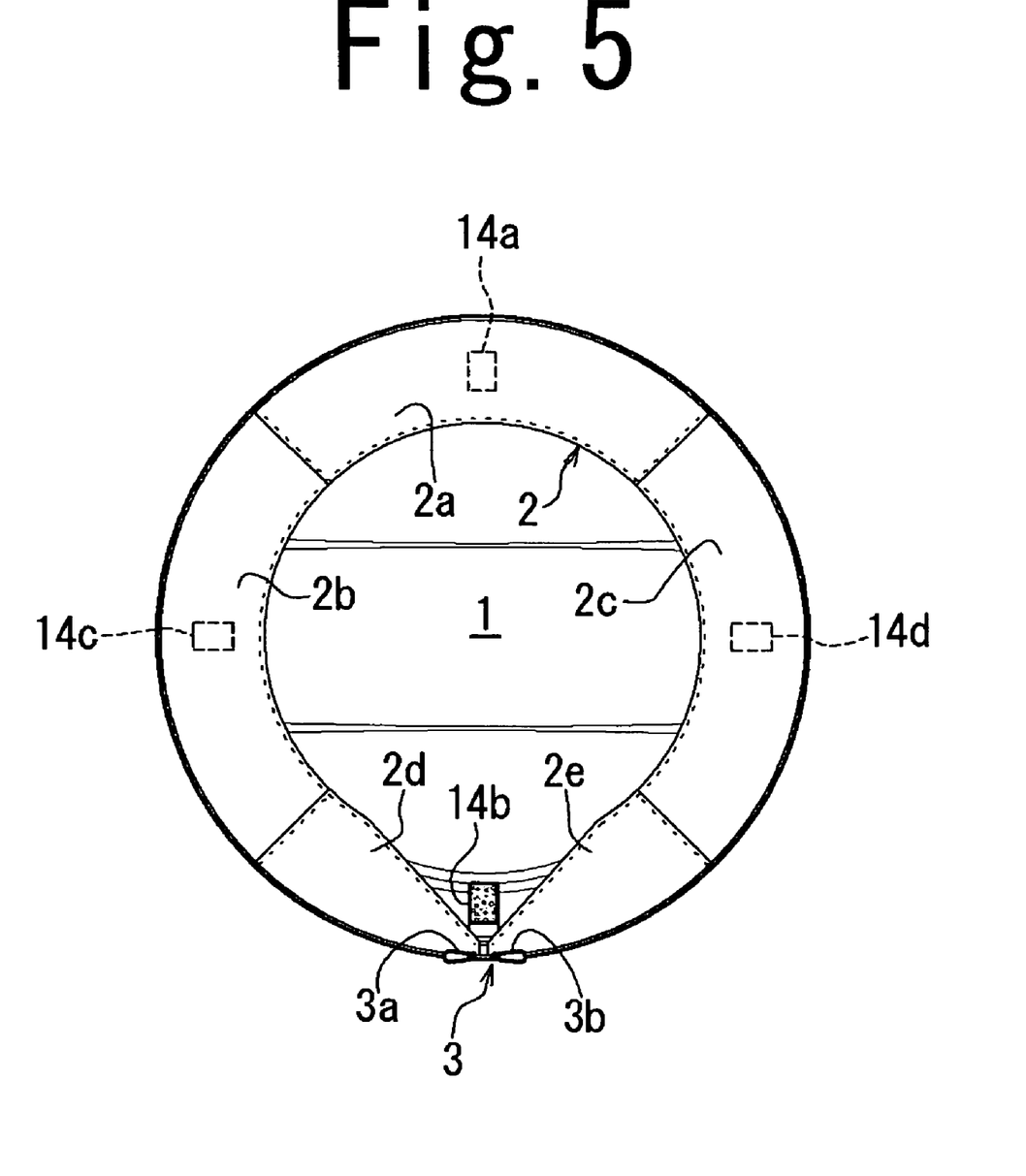
FIG. 5 is a back elevational view showing the spare tire cover of FIG. 1 from a rear cover side.

The rear cover 2 is formed from a flexible material such as a polyvinyl chloride leather or the like. This rear cover 2 is formed by cutting the flexible leather into one sheet having a predetermined shape or by cutting it into a center upper portion 2a, left and right side portions 2b and 2c and left and right lower portions 2d and 2e in view of efficiency for shaping and cutting as shown in FIG. 5 and sewing them together. The rear cover 2 is formed so as to create a surface covering one side surface of the spare tire T and which can be separated into left and right side sections defined by left side portion 2b and left lower portion 2d on the one hand and right side portion 2c and right lower portion 2e on the other hand. The center upper portion 2a is connected to the left and right side portions 2b and 2c and together have the same width. The left and right side portions 2b and 2c are in turn respectively connected to the left and right lower portions 2d and 2e. The left and right lower portions 2d and 2e have a width that tapers towards a lower part of the rear cover as shown in FIG. 5.

As the slide fastener 3, there is provided a structure in which a plurality of zipper teeth are attached so as to be aligned with opposing edges of respective fabric tapes and a slider engaging or disengaging the zipper teeth is provided. The slide fastener 3 is structured such that two lanes 3a and 3b extend along the left and right lower portions 2d and 2e and along left and right side portions 2b and 2c as far as the connection to the center upper portion 2a of the rear cover 2.

Figure 6:
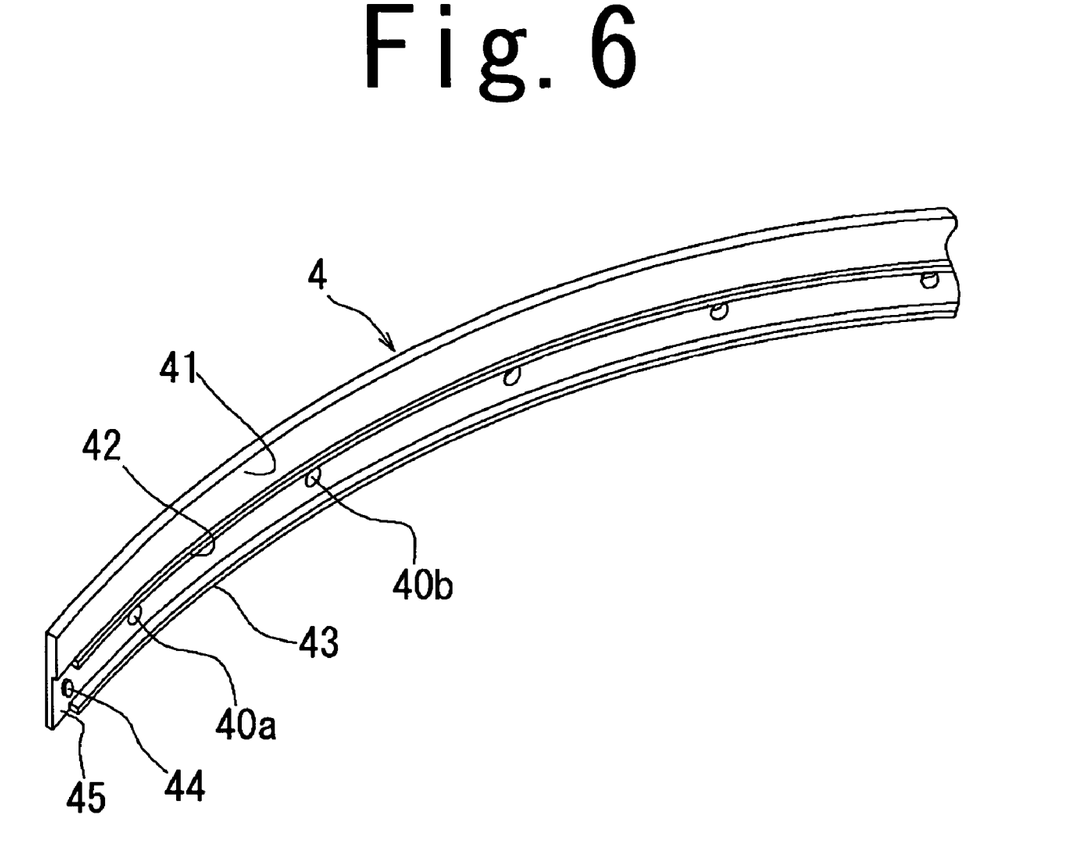
FIG. 6 is a partial perspective view showing a fix-up plate forming part of the spare tire cover of FIG. 1.

In addition to the respective portions in the structure mentioned above, a fixing plate 4 is provided as shown in FIG. 6. The fixing plate 4 is formed in a band plate shape in which a plurality of fixing holes 40a and 40b are arranged with a predetermined interval. In order to weld and connect the fixing plate 4 to the projections 10a and 10b provided on the top cover 1, the fixing plate 4 is formed from a resin material such as a polypropylene or the like which can be welded in accordance with an ultrasonic wave. Some of the fixing holes 40a, 40b are formed in circular hole shapes which facilitate positioning of the fixing plate 4 with respect to the top cover 1 when the projections of the top cover are fitted into the fixing holes 40a, 40b. Others of the fixing holes 40a, 40b are formed in oblong hole shapes which facilitate the fitting of the projections of the top cover 1 into the fixing holes 40a, 40b.

The fixing plate 4 includes a band part 41 having a thickness that is larger than the part of the fixing plate in which the fixing holes 40a and 40b are provided. Ribs 42 and 43 are provided, one on each side of the fixing holes 40a and 40b so as to prevent the welded projections 10a and 10b from being in contact with the surface of the spare tire and commonly serves as a reinforcement.

Figure 7:
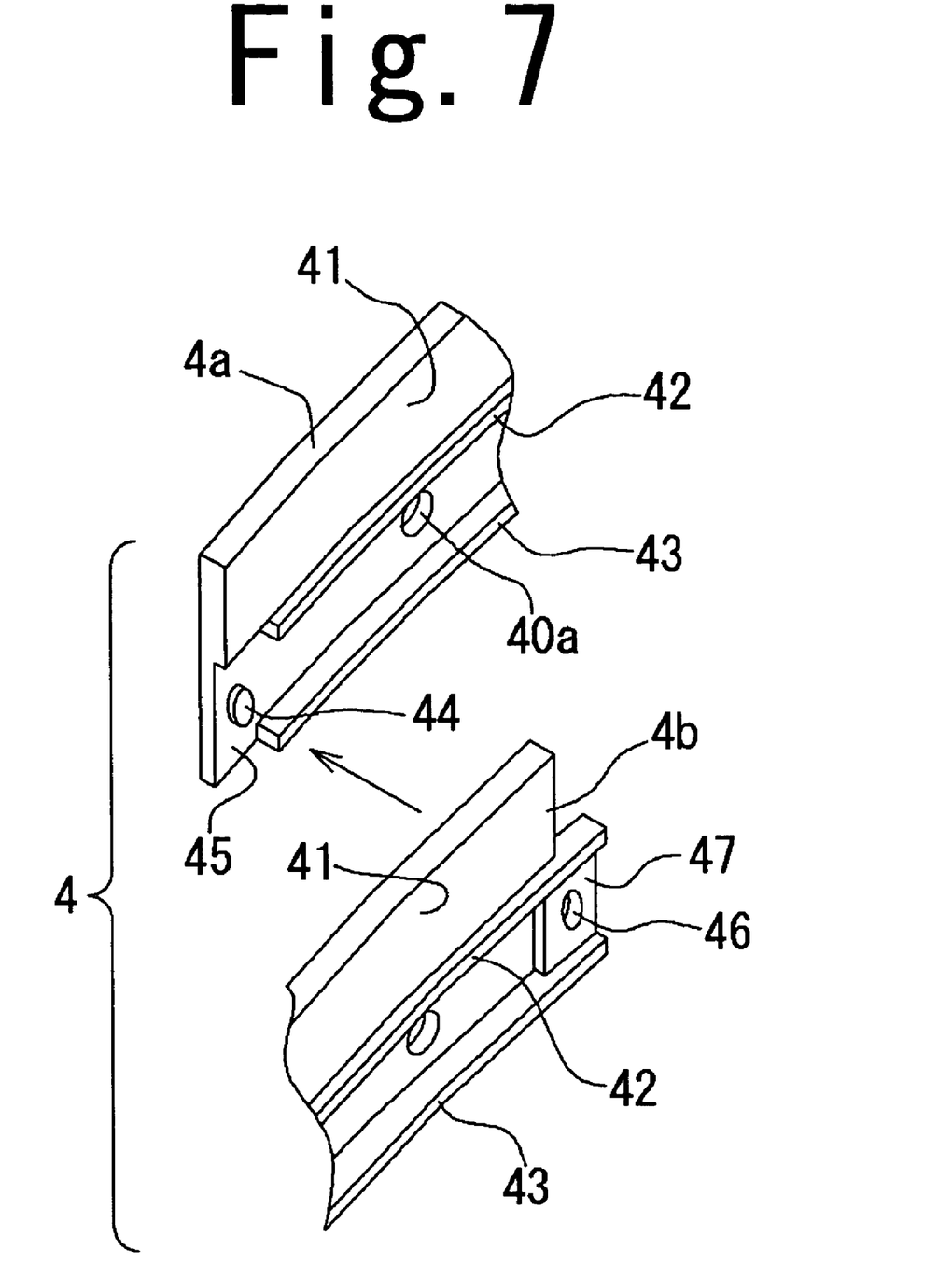
FIG. 7 is a partial perspective view showing a joint portion connecting the fix-up plate of FIG. 6.
Figure 7A:
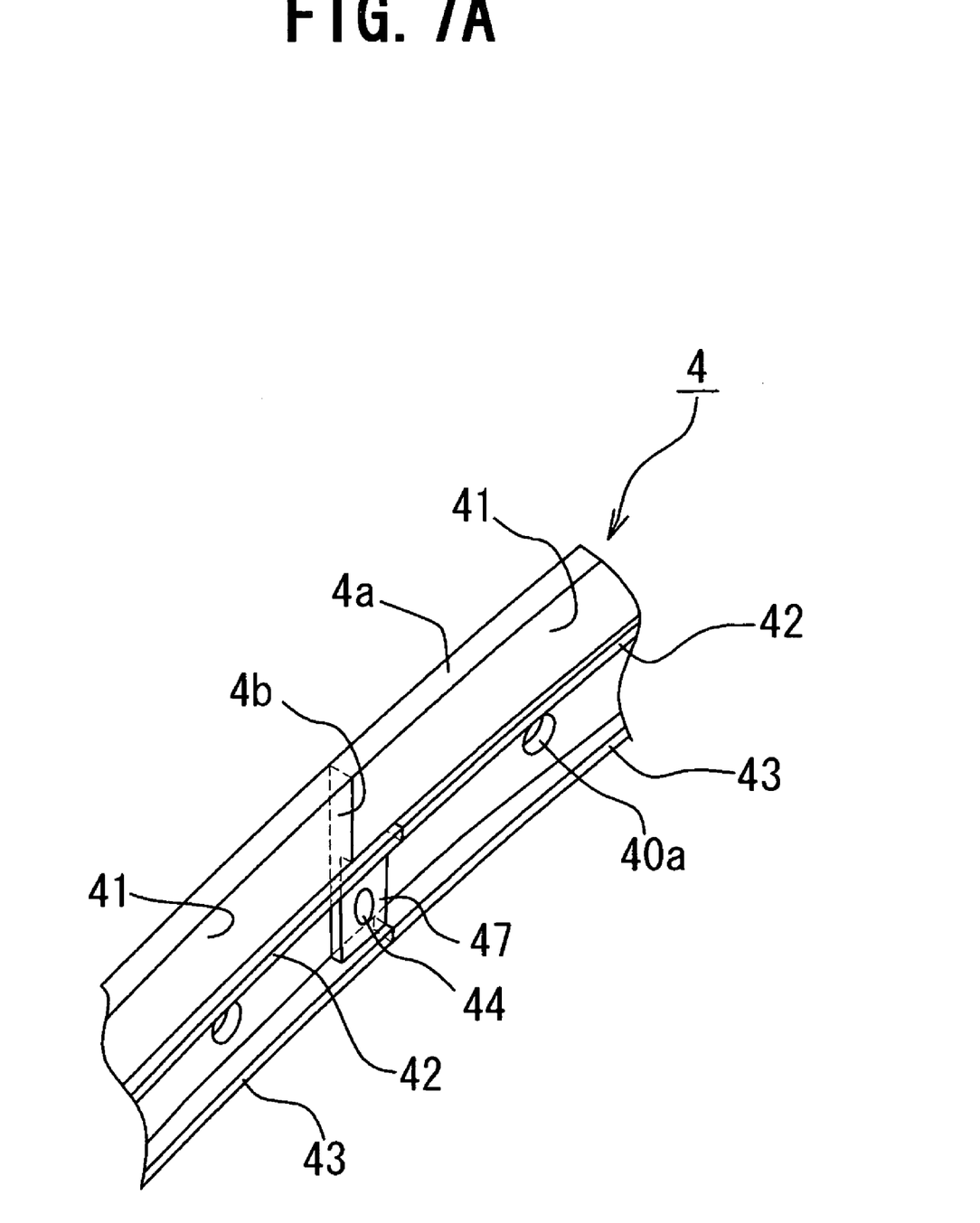
FIG. 7A is a schematic perspective view showing the fixing plate which is formed from a plurality of separate sections and in which the separate sections of the fixing plate are connected to each other.

The fixing plate 4 may be formed in a plurality of separate sections 4a and 4b for ease of handling and seaming etc., as shown in FIG. 7. The sections 4a and 4b can be connected and fixed to each other by providing each fixing plate with a receiving edge 45 having a projection 44 and a joint piece 47 with a fitting hole 46 for receiving the projection 44 of an adjacent section as shown in FIG. 7A.

Figure 8:
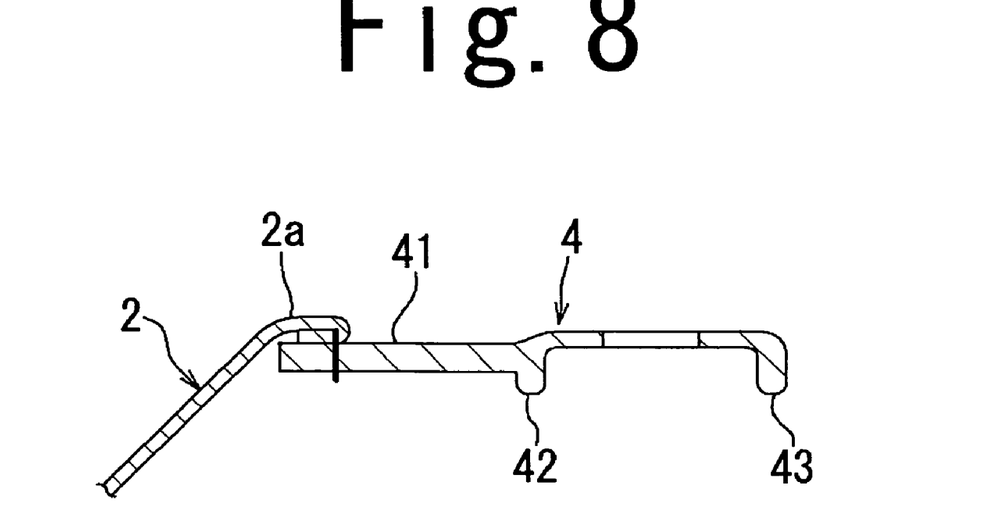
FIG. 8 is a schematic view showing a structure seaming the fix-up plate of FIG. 6 to a rear cover.

The fixing plate 4 is mounted to the center upper portion 2a of the rear cover 2 by folding back the rear cover 2 from the seam after overlapping the outer peripheral edge of the center upper portion 2a with the band part 41 and sewing the outer peripheral edge of the center upper portion 2a to the band part 41 of the fixing plate 4, as shown in FIG. 8.

Figure 9:
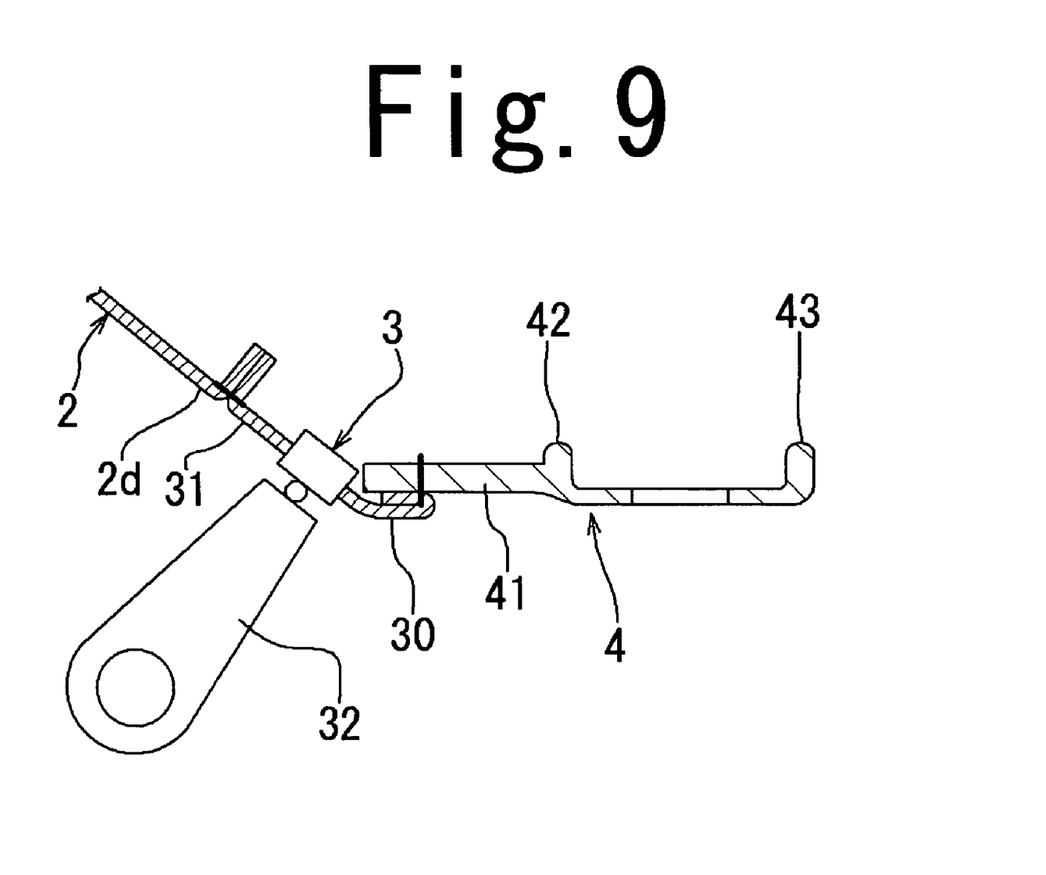
FIG. 9 is a schematic view showing a structure seaming a slide fastener including the fix-up plate of FIG. 6 to the rear cover.

Further, as shown in FIG. 9, the lower portion 2d of the rear cover 2 provided with the slide fastener 3 is mounted to the fixing plate 4 by overlapping and folding back one zipper teeth tape 30 and sewing it to the band part 41 of the fixing plate 4. A second zipper teeth tape 31 is overlapped with the lower portion 2d of the rear cover 2 and sewed together.

Figure 10A:
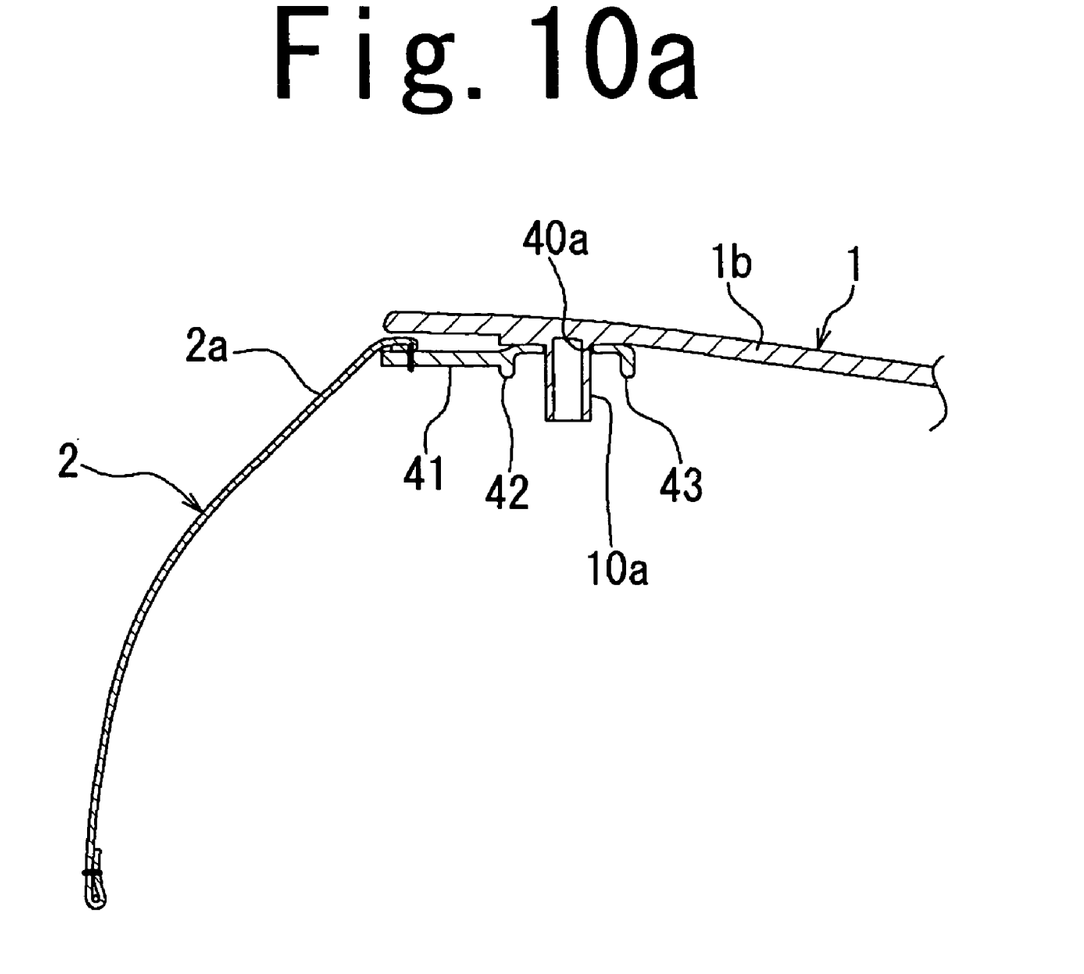
FIG. 10a is a schematic view showing the fix-up plate of FIG. 6 in a state of being assembled in an inner side of the top cover.
Figure 10B:
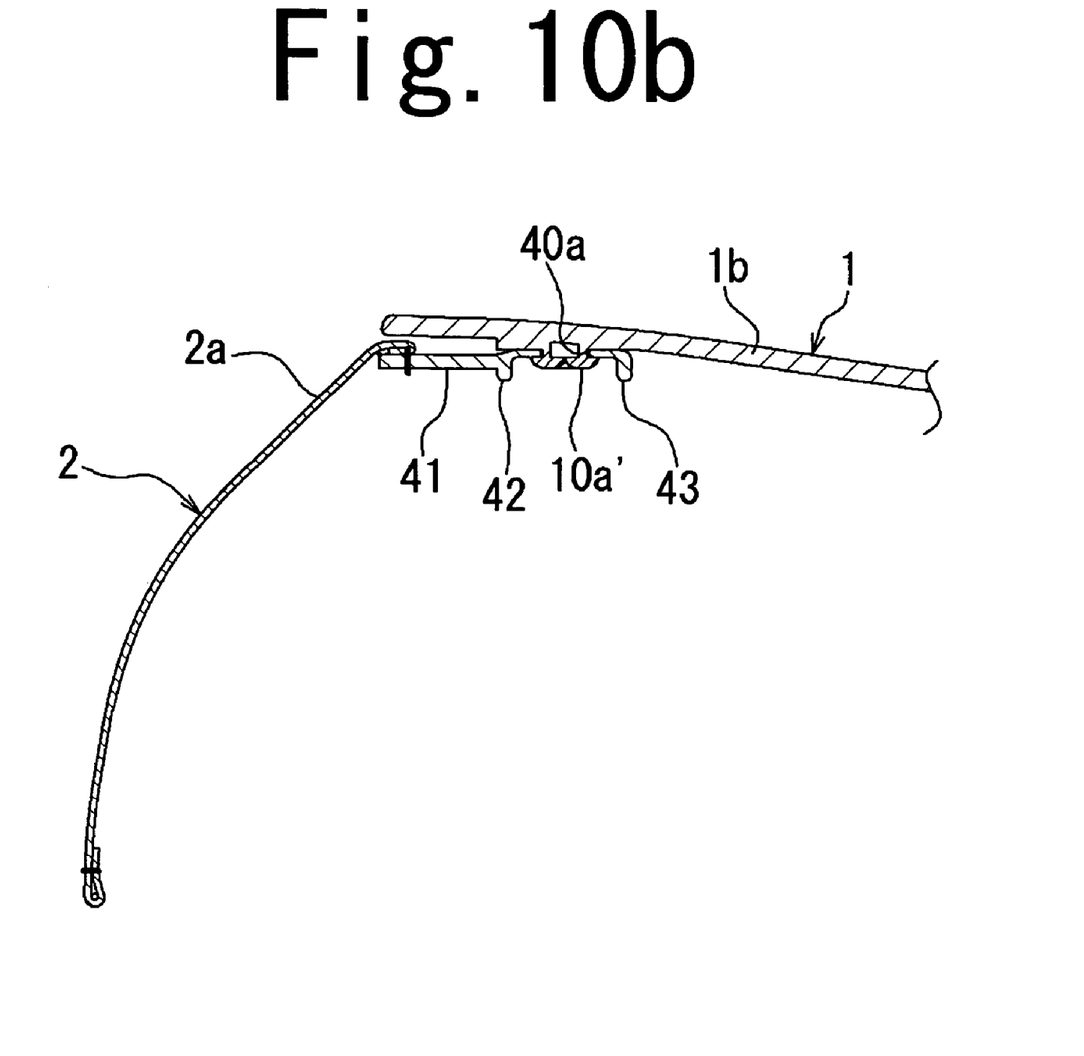
FIG. 10b is a schematic view showing the fix-up plate of FIG. 10a in a state of being welded and fixed to the inner side of the top cover.

The fixing plate 4 is assembled and arranged on the inner surface side of the top cover 1 by mounting the fixing plate 4 to the rear cover 2 and fitting the fixing holes 40a of the fixing plate 4 over the projections 10a provided on the top cover 1 as shown in FIG. 10a. The projections 10a are then deformed using an ultrasonic wave so that they are firmly fixed as welded projections 10a' as shown in FIG. 10b. In this way, the fixing plate 4 is firmly bonded and fixed along the inner surface of the top cover 1. Further, the rear cover 2 is integrally attached to the top cover 1 by means of the zipper teeth tape 30 and 31 (slide fastener 3) and the seamed portion of the rear cover 2 by the fixing plate 4.

In the spare tire cover structured in the manner mentioned above, since the slide fastener 3 and the seamed portion of the rear cover 2 are bonded and fixed to the inner surface of the top cover 1 by the fixing plate 4, there is no need for the flexible rear cover 2 to be sewn directly to the bulky hard top cover 1. The spare tire cover is therefore much easier to assemble. Further, since the slide fastener 3 and the seamed portion of the rear cover 2 are positioned on the inner side of the top cover 1, the seam is not exposed and it is possible to obtain a structure having a good visual appearance.

In addition, since the fixing plate 4 is welded and bonded to the top cover 1 using the projections 10a and 10b, and fixing plate 4 is reinforced by two ribs 42 and 43 provided in the longitudinal direction, it is possible to integrally attach the rear cover 2 to the top cover 1 on the basis of the strong structure.

When the spare tire cover is attached, the elastic pads 14a to 14d (refer to FIG. 5) provided near the upper, lower, left and right-hand corner portions 1c on the inner surface of the face portion 1a are interposed with respect to the side wall portion $t_2$ of the tire T and it is possible to prevent noise from being generated due to the friction between the tire T and the hard top cover 1. Further, since the ribs 42 and 43 of the fixing plate 4 project further than the welded projections 10a', the welded projections 10a' are not exposed to the friction deformation produced by the tire T.

Figure 11:
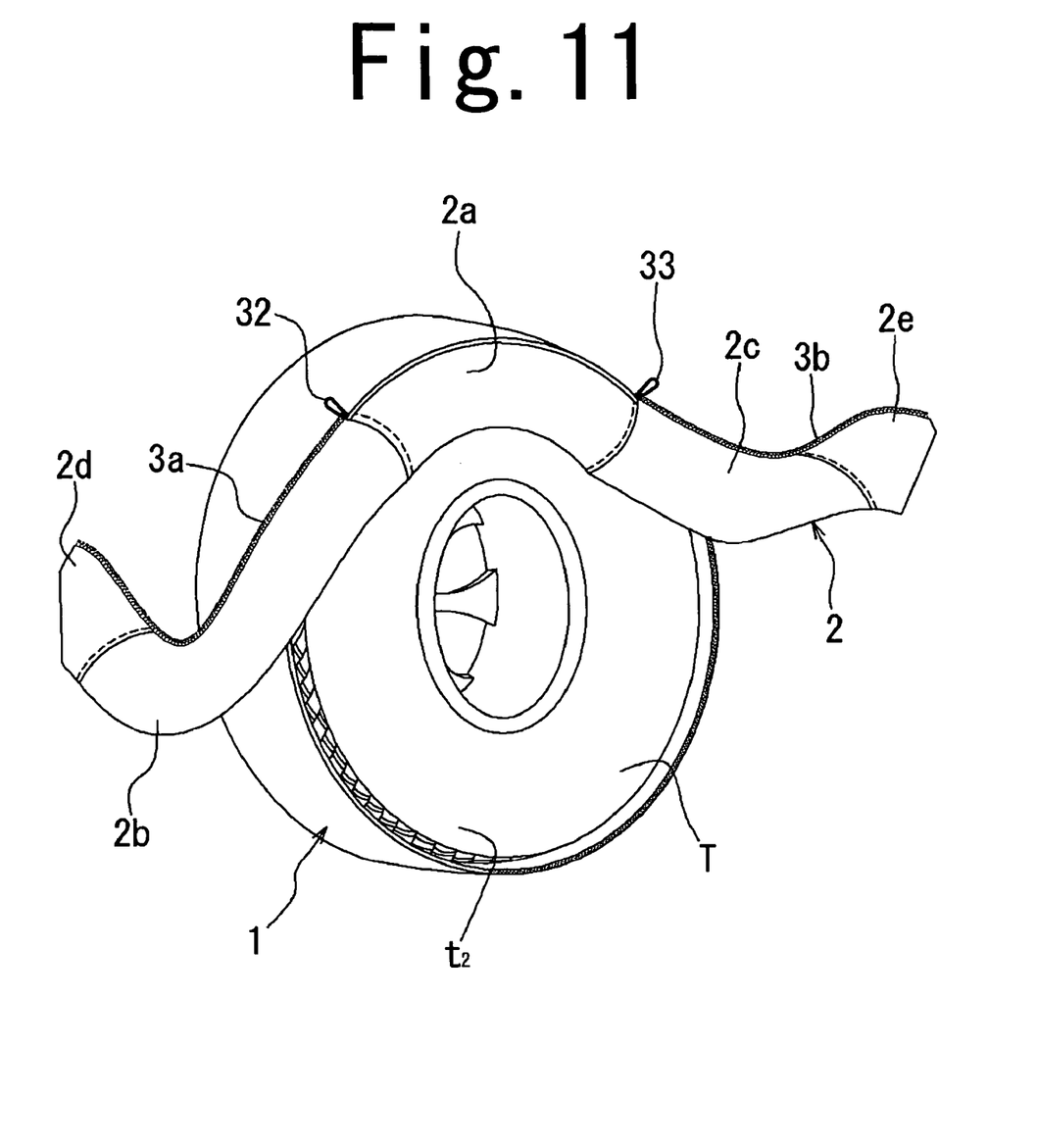
FIG. 11 is a schematic view showing the spare tire cover in accordance with the present invention in a state of being opened by the slide fastener.

The spare tire cover can be attached and detached by simply opening the rear cover 2 using the slide fasteners 3a and 3b as shown in FIG. 11. Further advantages are provided because the lower side portions 2d and 2e of the rear cover 2 where the left and right side sections are formed separate with the tapered narrow surface so that they are easy to handle and it is not necessary to mount a surface fastener.

Figure 12:
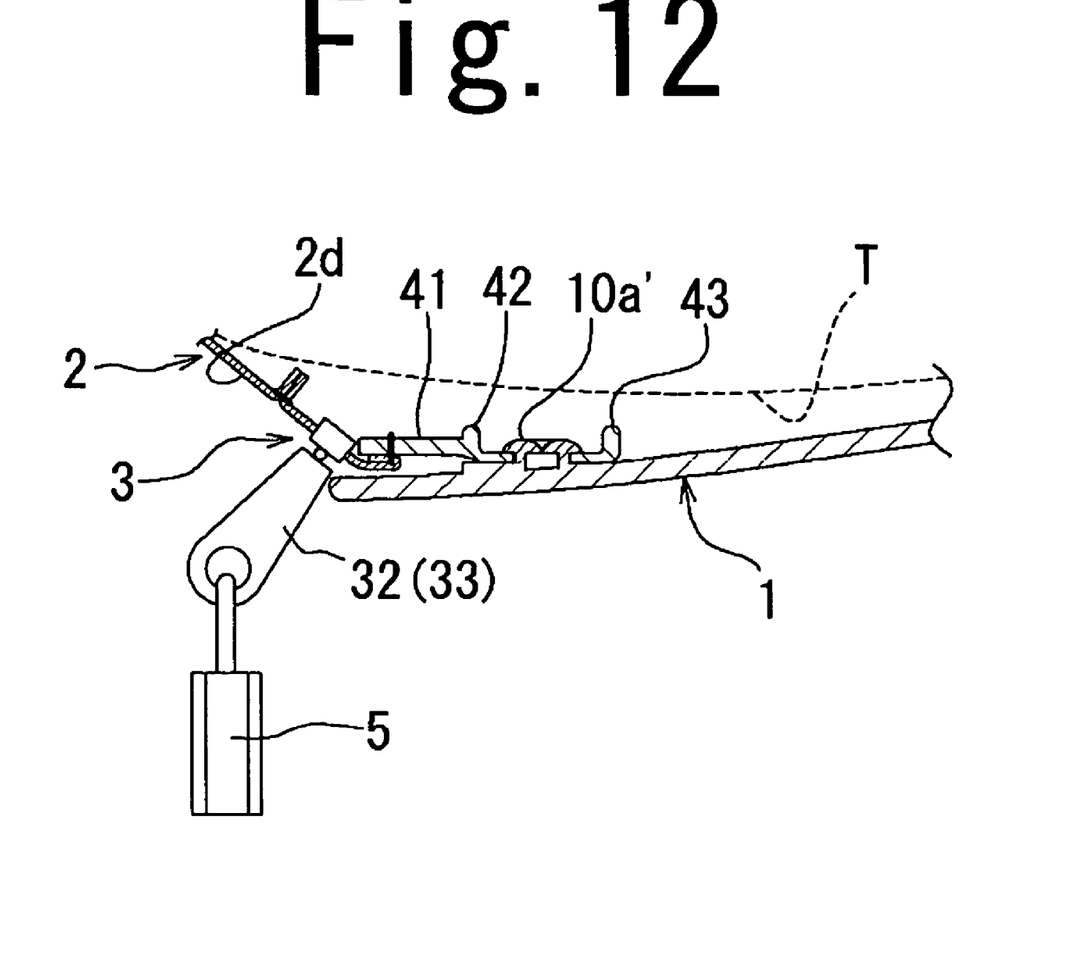
FIG. 12 is a schematic view showing the spare tire cover in accordance with the present invention in a state of being locked by a padlock.

When the spare tire cover is attached, the slide fasteners 3a and 3b can be locked together using a padlock 5 that is received through a hole in a tab 32 (33).

It will be readily appreciated that the spare tire cover may be made such that the slide fastener 3 is provided around the entire periphery from the lower portion of the rear cover 2. In this case, the fixing plate 4 may be mounted to the rear cover via the slide fastener 3 by sewing the fixing plate 4 to one zipper teeth tape all around its periphery and sewing another zipper teeth tape all around the periphery of the rear cover 2 except a lower part.

Alternatively, the slide fastener 3 can be omitted so that the rear cover 2 is directly attached to the top cover 1 by the fixing plate all around its periphery.

Other welding methods can be applied, and the top cover 1 and the fixing plate 4 may be formed by a resin material to which the selected welding method can be applied.

In the above description, terms and expressions used in the present specification are only employed for simply describing, and do not limit the contents of the present invention. If there are used restrictive terms and expressions, they do not intend to exclude equivalent structures to the present embodiment mentioned above or a part thereof. Accordingly, various modifications can be added within the scope of the present claimed invention.

What is claimed is:

1. A spare tire cover comprising:
   a cup-shaped hard top cover having a substantially cylindrical portion and an inner surface of which is provided with a plurality of inwardly directed projections arranged at predetermined circumferential intervals;
   a substantially cylindrical fixing plate having a plurality of holes through which the plurality of inwardly directed projections extend, the plurality of projections being deformed so as to secure the fixing plate to the inner surface of the cylindrical portion of the top cover, the fixing plate having a pair of circumferential elongated ribs disposed on opposite sides of the plurality of holes; and
   a flexible rear cover having a peripheral edge that is attached to the fixing plate.

2. A spare tire cover according to claim 1, wherein the flexible rear cover is integrally attached to the fixing plate around all of its peripheral edge.

3. A spare tire cover according to claim 1, wherein the flexible rear cover is integrally attached to the fixing plate around part of its peripheral edge, the remaining part of the peripheral edge being attached to a first zipper teeth tape and wherein a second zipper teeth tape is integrally attached to the fixing plate.

4. A spare tire cover according to claim 1, wherein the flexible rear cover is attached to a first zipper teeth tape around all of its periphery edge and wherein a second zipper teeth tape is integrally attached to the fixing plate.

5. A spare tire cover according to claim 3, further comprising a slide fastener which runs along the zipper teeth of the first and second zipper teeth tapes.

6. A spare tire cover according to claim 1, wherein the top cover has a corner portion and a face portion, an inner surface of the face portion adjacent the corner portion being provided with at least one elastic pad for contacting an outer surface of a spare tire in use.

7. A spare tire cover according to claim 6, wherein an inner surface of the corner portion is provided with a plurality of reinforcing ribs.

8. A spare tire cover according to claim 1, wherein the fixing plate is formed in a plurality of separate sections.

9. A spare tire cover according to claim 1, wherein the fixing plate is made of the same material as the top cover and can be welded thereto.

10. A spare tire cover according to claim 1, wherein the fixing plate and the hard top cover are formed from a resin material.

* * * * *